United States Patent [19]
Noly

[11] 3,826,342
[45] July 30, 1974

[54] UNIT TRANSMISSION GEAR INCLUDING A DECELERATING DEVICE AND AN ELECTROMAGNETIC BRAKE

[75] Inventor: Jean Noly, La Clayette, France

[73] Assignee: Potain, Chevilly Larue (Val de Marne), France

[22] Filed: Aug. 2, 1972

[21] Appl. No.: 277,328

[30] Foreign Application Priority Data
Aug. 6, 1971   France ............................ 71.29642

[52] U.S. Cl. .............................................. 188/171
[51] Int. Cl. ............................................... B60t 13/74
[58] Field of Search ........... 188/156, 164, 171, 159, 188/160; 310/67 R, 105

[56] References Cited
UNITED STATES PATENTS

| | | | |
|---|---|---|---|
| 2,693,254 | 11/1954 | Barish | 188/171 |
| 2,847,594 | 8/1958 | Cohen et al. | 310/105 X |
| 2,983,339 | 5/1961 | Neff | 188/171 |
| 3,605,958 | 9/1971 | McCarthy | 188/171 |

Primary Examiner—Duane A. Reger
Attorney, Agent, or Firm—Browdy and Neimark

[57] ABSTRACT

A unit decelerating assembly may be used for control of cranes or travelling cranes. The working speed of the belts 3 is transmitted to the end shaft 23 which is slowed down to an extent depending on the current flow supplied to the fixed inductor 4–18 of an eddy-current clutch (bell 6). The spring 22 ensures the braking of the disc 14 to block the apparatus in the event of a failure of current.

3 Claims, 3 Drawing Figures

PATENTED JUL 30 1974                    3,826,342

UNIT TRANSMISSION GEAR INCLUDING A DECELERATING DEVICE AND AN ELECTROMAGNETIC BRAKE

The present invention relates to a transmission assembly, comprising an eddy-current decelerating device, a safety electromagnetic brake, and a transmission pulley.

A device according to the invention is characterized in that it comprises:

a driving member, such as a pulley or a pinion, keyed on a rotatable shaft;

a braking disc adapted to be rotatively driven by one of the ends of said shaft;

a connecting tip provided on the opposite end of the rotatable shaft;

the bell of an eddy-current clutch rigid with the rotatable shaft;

the fixed inductor completing the eddy-current clutch, the inductor being rigid with the stationary casing of the apparatus;

a brake-lining holder, movable in the axial direction, opposite the rotatable disc, and rigid with an armature;

a spring which tends to return the armature and the lining holder to their braking position on the disc;

a wound yoke, which, when supplied with electric current, tends to attract the armature and the holder to a non-braking position against the action of said spring.

According to a first embodiment, the braking disc is movable in the axial direction on the rotatable shaft, and it rotates between a set of fixed linings adjacent one of its faces and the set of linings of the lining holder on its opposite face.

According to a modification, the braking disc is rigidly keyed on the rotatable shaft, while the braking is effected on one of its faces only, by friction against the lining on the lining holder.

The attached drawing, given by way of non-limiting example, will allow understanding the features of the invention better.

Figure 1:
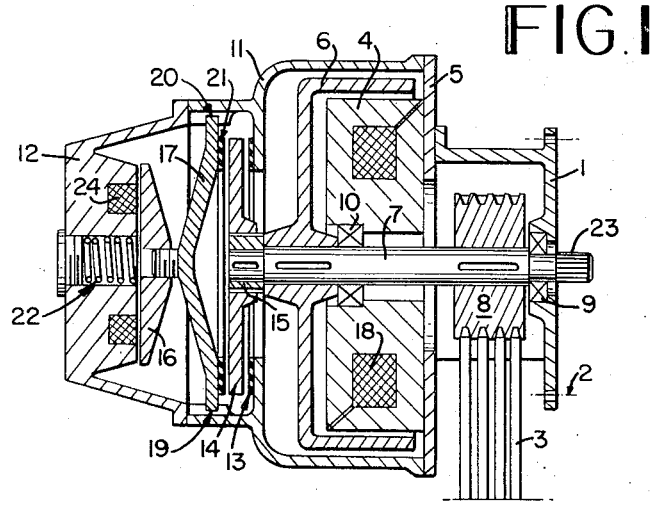
FIG. 1 is an axial section of a decelerating device according to the invention, in its position of use.
Figure 2:
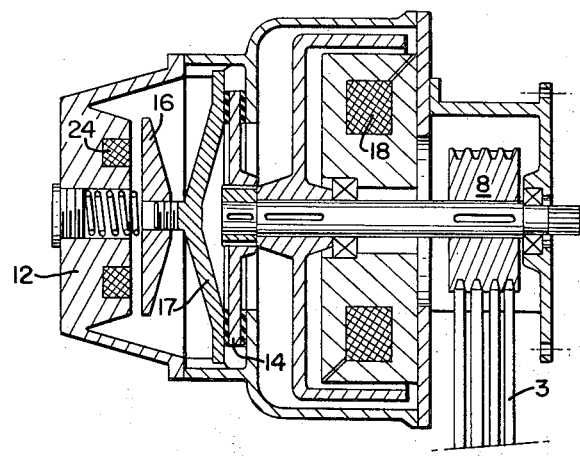
FIG. 2 shows the same device in its blocked position.

The device shown in FIGS. 1 and 2 comprises:
a. a support 1 intended to be fastened on the receiving reduction gear by means of the screws 2; openings are provided in the support 1 for the transmission belts 3;
b. a wound inductor 4, secured and connected to the support 1 by the fixing flange 5;
c. a bell 6, covering the inductor 4, and mounted on the rotatable shaft 7;
d. a pulley 8 mounted on the central shaft 7;
e. the motion transmitting shaft 7 mounted on the bearings 9 and 10;
f. a brake support 11; the wound yoke 12 controlling the electro-brake, and one of the friction linings 13 mounted on the support 11;
g. a brake disc 14, the axial translatory motion of which is free, while it is rotatively driven by the fluted sleeve 15 integral with the shaft 7;
h. a movable armature 16, disposed within the magnetic field of the wound yoke 12;
i. a brake lining holder 17, the translatory motion of which is free, the holder 17 being prevented from rotating by the axial spigots 19 and 20;
j. a compression spring 22 ensuring an axial thrust on the friction linings 13 and 21.

The lining holder 17 is integral with the movable armature 16 and the friction lining 21.

The operation is as follows:

The assembly is mounted on a reduction gear, the end or tip 23 of the shaft 7 being connected to the first pinion of said gear. The safety brake being put off, some driving member drives the pulley 8 through the belts 3. The pulley 8 transmits its motion to the shaft 7, the bell 6, and the brake disc 14, which are rotatively driven.

Switching on the coil 18 of the inductor 4 allows slowing down the rotation of the shaft 7, and stabilizing the speed of the latter at a selected value by adjusting the energizing current in the coil.

The device is completely stopped by cutting off the supply of current to the winding 24 of the electro-brake 12: the armature 16 is no longer attracted by the wound yoke 12, and the spring 22, through the agency of the lining holder 17, brings the brake disc 14 against the linings 13 and 21 (FIG. 2).

Figure 3:
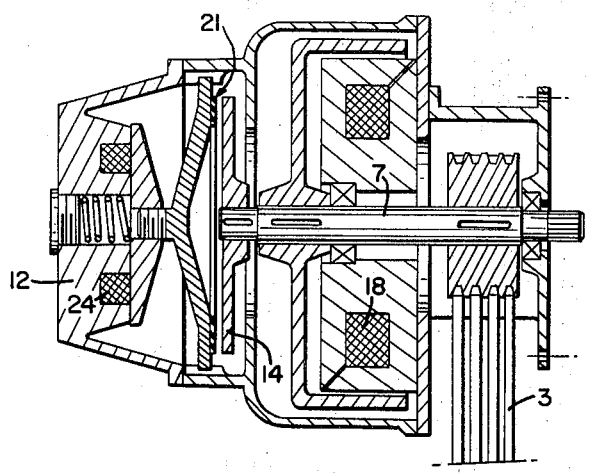
FIG. 3 shows a modified embodiment of said device.

The modification illustrated in FIG. 3 is most suitable for gears intended for reduced braking torques. Here, the safety brake is fitted with one lining 21 only the lining 13 being omitted. The brake disc 14 is mounted so as to rotate and move axially together with the shaft 7.

According to a further modification, not shown, permanent magnets are incorporated in the wound yoke 12, which makes it possible to obtain two stable positions for the movable armature 16, the coil 24 being switched off.

I claim:

1. A transmission device for a rotary shaft, comprising:

a driving member keyed on a rotatable shaft;

a rotatable braking disc on one of the ends of said rotatable shaft;

a connecting tip provided on the opposite end of the rotatable shaft;

an eddy-current clutch bell rigidly mounted on said rotatable shaft;

an eddy-current clutch inductor rigidly fixed stationary with respect to said shaft and bell, and located within the curvature of said bell;

a brake-lining holder, movable in the axial direction and located axially opposite said rotatable disc;

an armature connected to said brake-lining holder;

spring means to urge the armature and the lining holder to their braking position against said rotatable braking disc;

a wound yoke opposite said armature, which, when supplied with electric current, attracts said armature and said holder to a non-braking position against the action of said spring.

2. A transmission device according to claim 1, wherein said braking disc is movable in the axial direction on said rotatable shaft, and rotates between a set of fixed linings opposite one of its faces and a set of linings on said lining holder opposite its other face.

3. A transmission device according to claim 1, wherein said braking disc is rigidly keyed on said rotatable shaft, while the braking is effected on one of its faces only, by friction against the lining on said lining holder.

* * * * *